United States Patent
Zaman et al.

(10) Patent No.: US 7,657,516 B2
(45) Date of Patent: Feb. 2, 2010

(54) CONVERSION OF A RELATIONAL DATABASE QUERY TO A QUERY OF A MULTIDIMENSIONAL DATA SOURCE BY MODELING THE MULTIDIMENSIONAL DATA SOURCE

(75) Inventors: Kazi A. Zaman, Belmont, CA (US); Shimin Song, Burlingame, CA (US); Ed Shaw-Lee Suen, Burlingame, CA (US)

(73) Assignee: Siebel Systems, Inc., San Mateo, CA (US)

( * ) Notice: Subject to any disclaimer, the term of this patent is extended or adjusted under 35 U.S.C. 154(b) by 404 days.

(21) Appl. No.: 10/726,338

(22) Filed: Dec. 1, 2003

(65) Prior Publication Data

US 2007/0208721 A1    Sep. 6, 2007

(51) Int. Cl.
G06F 7/00 (2006.01)
G06F 17/30 (2006.01)

(52) U.S. Cl. .................. 707/4; 707/5; 707/6; 707/100; 707/102

(58) Field of Classification Search ............ 707/3, 707/4
See application file for complete search history.

(56) References Cited

U.S. PATENT DOCUMENTS

| | | | | |
|---|---|---|---|---|
| 5,675,785 A | * | 10/1997 | Hall et al. | 707/102 |
| 5,926,818 A | * | 7/1999 | Malloy | 707/100 |
| 5,987,452 A | * | 11/1999 | Kung | 707/4 |
| 6,385,604 B1 | * | 5/2002 | Bakalash et al. | 707/3 |
| 6,484,179 B1 | * | 11/2002 | Roccaforte | 707/102 |
| 6,594,672 B1 | * | 7/2003 | Lampson et al. | 707/103 R |
| 6,629,102 B1 | * | 9/2003 | Malloy et al. | 707/102 |
| 6,721,760 B1 | * | 4/2004 | Ono et al. | 707/104.1 |
| 7,269,581 B2 | * | 9/2007 | Petculescu et al. | 707/1 |
| 7,366,730 B2 | * | 4/2008 | Greenfield et al. | 707/102 |
| 2002/0087516 A1 | * | 7/2002 | Cras et al. | 707/2 |
| 2002/0091681 A1 | * | 7/2002 | Cras et al. | 707/3 |
| 2002/0124002 A1 | * | 9/2002 | Su et al. | 707/100 |
| 2004/0039736 A1 | * | 2/2004 | Kilmer et al. | 707/3 |
| 2004/0236767 A1 | * | 11/2004 | Soylemez et al. | 707/100 |
| 2005/0004904 A1 | * | 1/2005 | Keamey et al. | 707/3 |

OTHER PUBLICATIONS

Garcia-Molina, Hector et. al. "Database Systems The complete book". Prentice Hall. 2002. pp. 277, 280,282.*

* cited by examiner

Primary Examiner—John R Cottingham
Assistant Examiner—Michael Pham
(74) Attorney, Agent, or Firm—Campbell Stephenson LLP

(57) ABSTRACT

A facility for processing a relational database query is described. The facility receives the relational database query, and constructs a multidimensional database query based on the received relational database query. The facility submits the constructed multidimensional database query for execution against a multidimensional data source.

19 Claims, 12 Drawing Sheets

CONVERSION OF A RELATIONAL DATABASE QUERY TO A QUERY OF A MULTIDIMENSIONAL DATA SOURCE BY MODELING THE MULTIDIMENSIONAL DATA SOURCE

TECHNICAL FIELD

The present invention is directed to the field of database systems, and, more particularly, to the fields of data modeling and query generation.

BACKGROUND

Relational database management systems ("RDMSs," or "relational databases") store data in tables having rows and columns. A variety of queries can be performed on such tables, using a query language More recently, multidimensional database management systems ("MDDBMSs," or "MD databases") have become available. MD databases use the idea of a data cube to represent different dimensions of data available to a user. For example, sales could be viewed in the dimensions of product model, geography, time, or some additional dimension. In this case, sales is described as the measure attribute of the data cube and the other dimensions are described as feature attributes. Additionally, hierarchies and levels may be defined within a dimension (for example, state, city, and country levels within a regional hierarchy in the geography dimension).

In MD databases, data is rigorously coordinated in a way that enables it to support powerful and useful queries. Certain limitations of MD databases can be the source of significant disadvantages, however. An MD database typically must be queried through a special database engine, using special type of multidimensional query. Many existing database and database-driven applications, while offering support for accessing data stored in one or more types of relational databases, fail to offer support for accessing data stored in an MD database. Additionally, while many computer users are competent to formulate a query and analyze a query result for relational databases, relatively few are competent to do so for MD databases. Further, it can be difficult or impossible to combine data extracted from an MD data source with data extracted from more conventional data sources, such as a relational database.

Accordingly, an approach that enabled conventional database and database-driven applications to model multidimensional data sources as relational data sources and transparently query them would have significant utility.

DETAILED DESCRIPTION

A software facility for modeling multidimensional data sources as relational data tables ("the facility") is provided. The facility enables database applications and database-driven applications that support accessing data in relational data tables to access multidimensional data sources that are modeled by the facility. A set of such applications with which the facility may be used is virtually unbounded, and includes the Siebel Analytics Server product from Siebel Systems of San Mateo Calif.

In some embodiments, the facility analyzes an MD data source, constructs a relational model of the MD data source, translates relational queries against the model into multidimensional queries against the MD data source, and translates query results produced by multidimensional queries into relational query results in accordance with the model.

The model constructed by the facility includes schemas for one or more virtual relational tables—or other metadata for these virtual relational tables—exposing at least some of the data stored in the MD data source. The model further includes mappings between the model's relational schema and the MD data source that may be used by the facility both to translate relational queries against the relational schema to multidimensional queries against the MD data source, and to translate the resulting multidimensional query results to relational query results in accordance with the relational schema. In some embodiments, the facility uses additional relational/multidimensional equivalency logic in its translation of queries and query results.

In some embodiments, the facility enables a user to input a composite relational query that references both data in the MD data source and data in one or more conventional relational tables. When it receives such a composite query, the facility decomposes it into a native relational portion referencing conventional relational tables and a virtual relational portion referencing the relational schema of the model of the MD data source; executes the native relational portion against conventional relational tables and translates and executes the virtual relational portion as discussed above; and combines the resulting relational query results into a single relational query result for the composite relational query.

By modeling an MD data source in some or all of the ways described above, the facility enables users to exploit data within the MD data source using database and database-driven applications that support only relational databases, without requiring the applications or their users to understand MD data sources, formulate multidimensional queries, or interpret the resulting query results.

Figure 1:
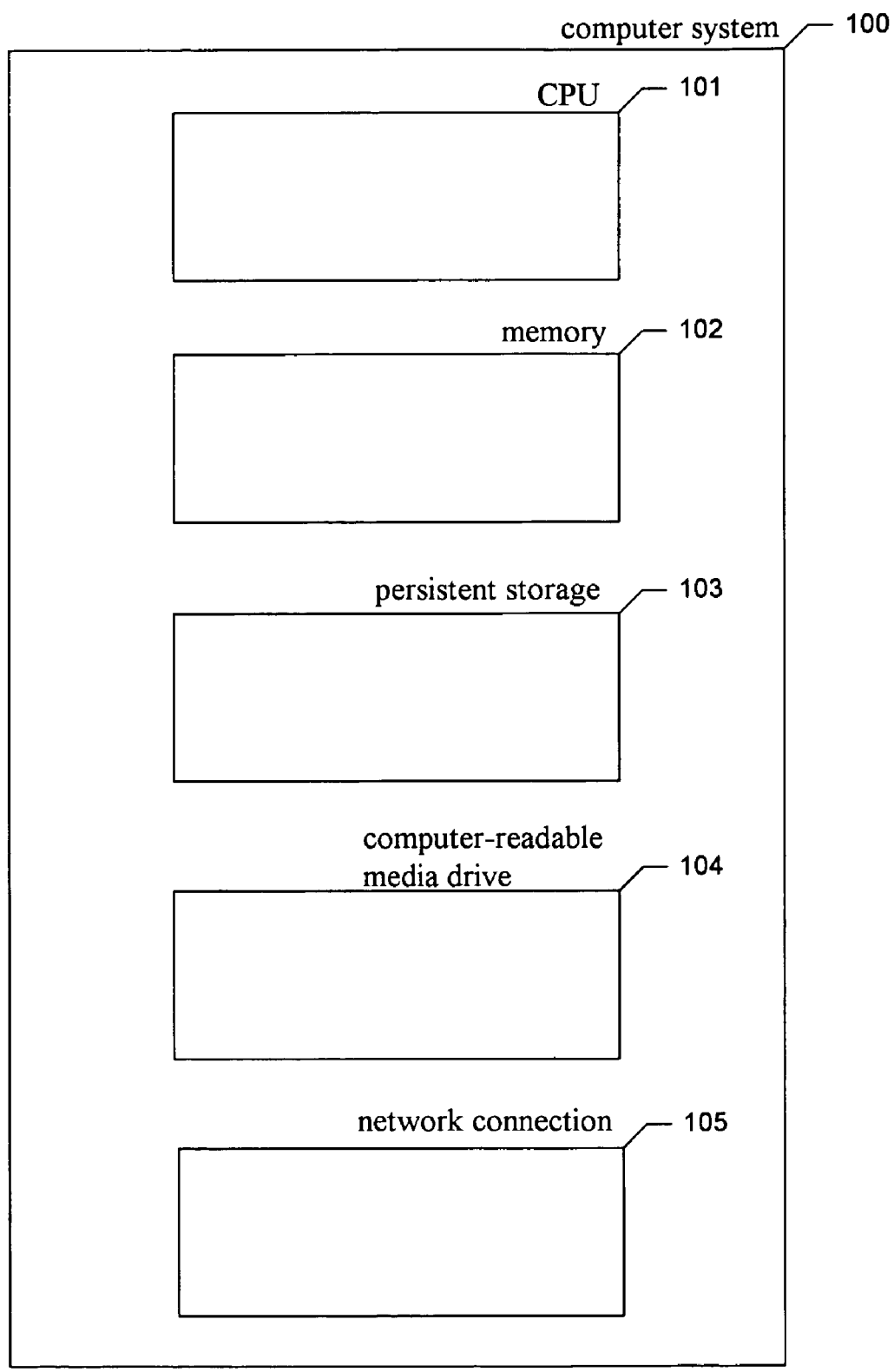
FIG. 1 is a block diagram showing some of the components typically incorporated in at least some of the computer systems and other devices on which the facility executes.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

Figure 2:
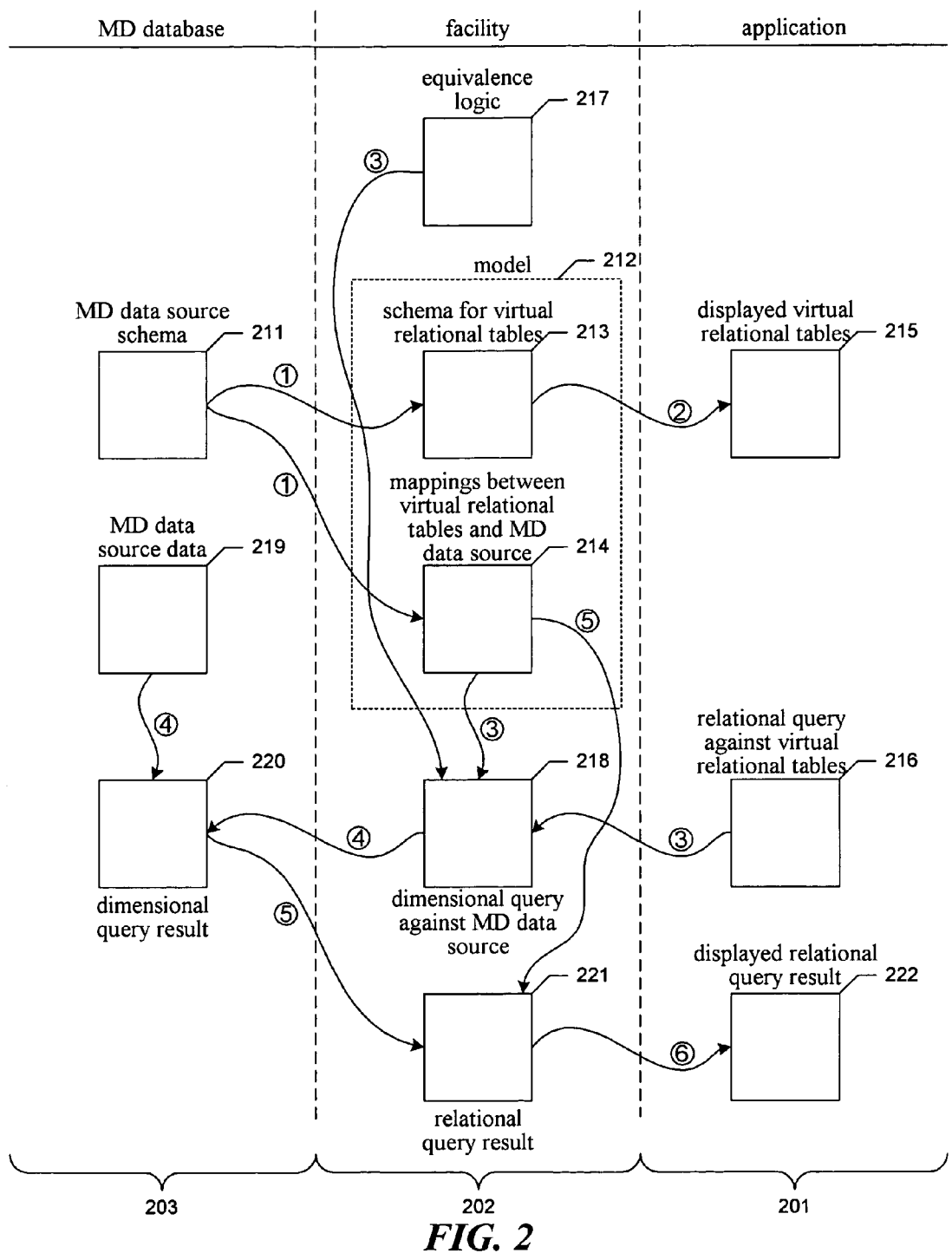
FIG. 2 is a data flow diagram showing a typical data flow produced by the operation of the facility.

FIG. 2 is a data flow diagram showing a typical data flow produced by the operation of the facility. The diagram is divided into an application column 201 that shows activity performed by a database application or database-driven application that uses the facility to access an MD data source; a facility column 202 that shows activity by the facility; an MD database column 203 that shows activity by the MD database system. At time 1, an MD data source schema 211 stored by the MD database is used by the facility to construct a model 212 of the MD data source. In particular, the MD data source schema is used to construct a schema 213 for virtual relational tables representing the MD data source, and mappings 214 between the virtual relational tables and components of the MD data source. At time 2, the schema for virtual relational tables is used to display virtual relational tables 215 in the application. At time 3, a relational query 216 against the virtual relational tables created in the application is used by the facility, together with relational/multidimensional equivalent logic 217 and the mappings 214, to construct a corresponding multidimensional query 218 against the MD data source. At time 4, the facility executes the multidimensional query against the MD data source data 219 to create a multidimensional query result 220. At time 5, the facility translates the multidimensional query result into a relational query result 221 relating to the virtual relational tables. At time 6, the application displays or otherwise uses the relational query result 222.

Figure 3:
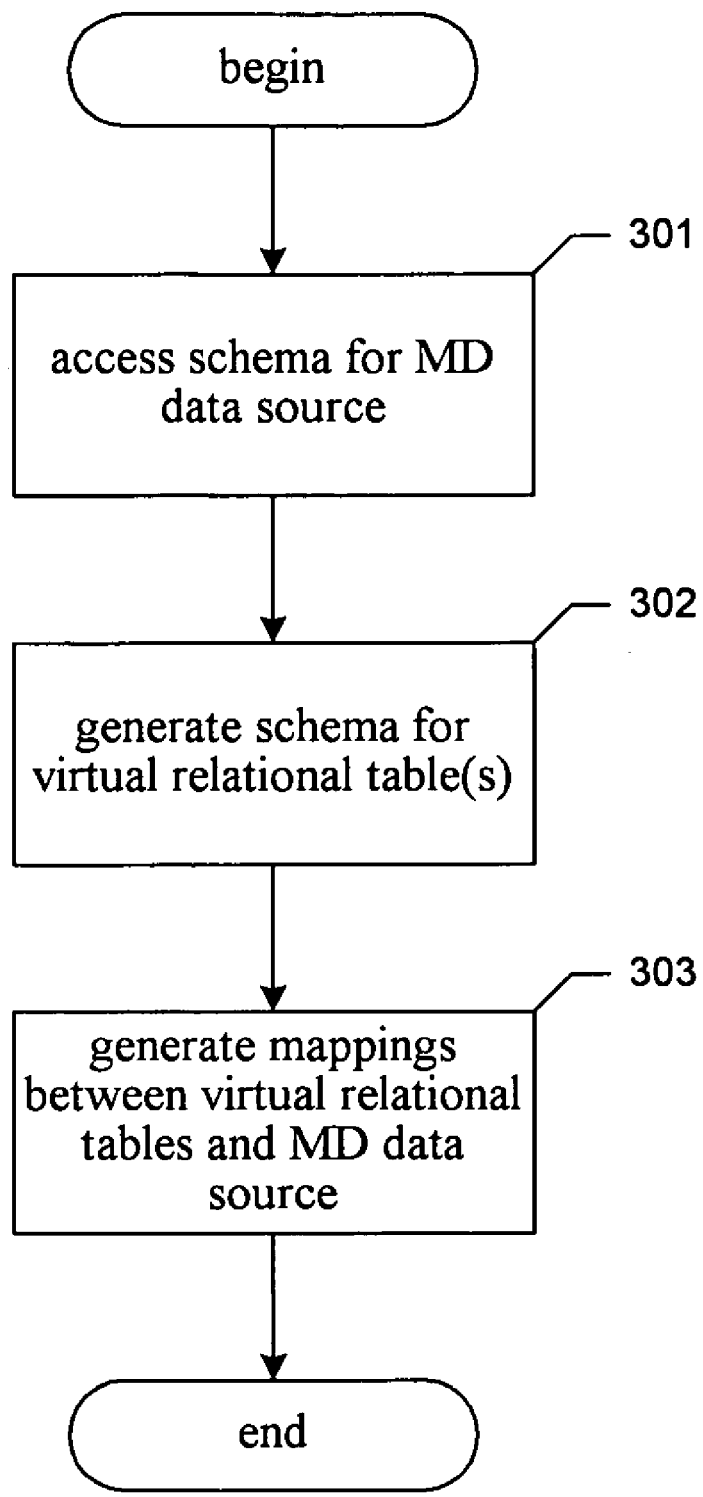
FIG. 3 is a flow diagram showing steps typically performed the facility in order to model an MD data source.

FIG. 3 is a flow diagram showing steps typically performed the facility in order to model an MD data source. In step 301, the facility accesses the schema for the MD data source. In some embodiments, the facility in step 301 accesses metadata for the MD data source in addition to, or instead of, the schema for the MD data source. In step 302, the facility uses the accessed MD data source schema or other metadata to generate schemas or other metadata for one or more virtual relational tables that will serve as a proxy for the MD data source to the application. In some embodiments, the facility utilizes user input to assist in designing the schemas or other metadata for the virtual relational tables. In some embodiments, where the MD data source contains two different hierarchies, each having a level with the same name, the facility specifies in the metadata for the virtual relational tables two columns, both having an external name that is the same as the common hierarchy level name, and each having an internal name that is different and that distinguishes the two columns. In step 303, the facility generates mappings between the virtual relational tables defined in step 302 and the contents of the MD data source. After step 303, these steps conclude.

Figure 4:
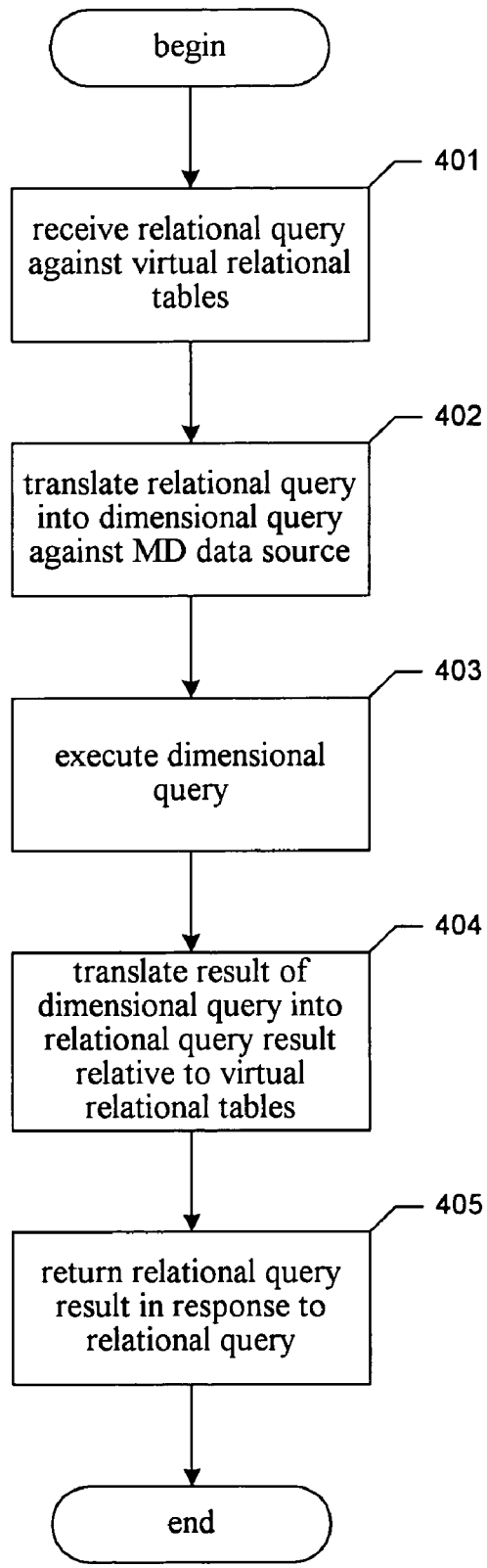
FIG. 4 is a flow diagram showing steps typically performed by the facility in order to process a relational query against the MD data source.

FIG. 4 is a flow diagram showing steps typically performed by the facility in order to process a relational query against the MD data source. In step 401, the facility receives a relational query against one or more virtual relational tables. In step 402, the facility uses the mappings generated in step 303, together with equivalent logic more generally mapping between relational queries and structures and multidimensional queries and structures, to translate the relational query received in step 402 into a multidimensional query against the MD data source. In some embodiments, the facility translates the relational query into a multidimensional query expressed in the Multidimensional Expressions ("MDX") query language, described in Microsoft SQL Server 2000 Analysis Services: MDX, available at http://msdn.microsoft.com/library/default.asp?url=/library/en-us/ olapdmad/agmdxbasics_04qg.asp, and Microsoft SQL Server 2000 Booksonline, available at http://www.microsoft.com/sql/techinfo/productdoc/2000/books.asp, each of which is hereby incorporated by reference in its entirety. In step 403, the facility executes the multidimensional query created in step 402. In step 404, the facility translates the result produced from the multidimensional query into a relational query result that is relative to the virtual relational tables. In step 405, the facility returns the relational query result in response to the relational query received in step 401. After step 405, these steps conclude.

In some embodiments, the facility processes a composite query that references both virtual relational tables and native relational tables. For such composite queries, the facility typically executes the native portion of the relational query in parallel with steps 402-404, and combines the results therefrom with the relational query result created in step 404 to be returned in step 405.

Figure 5:
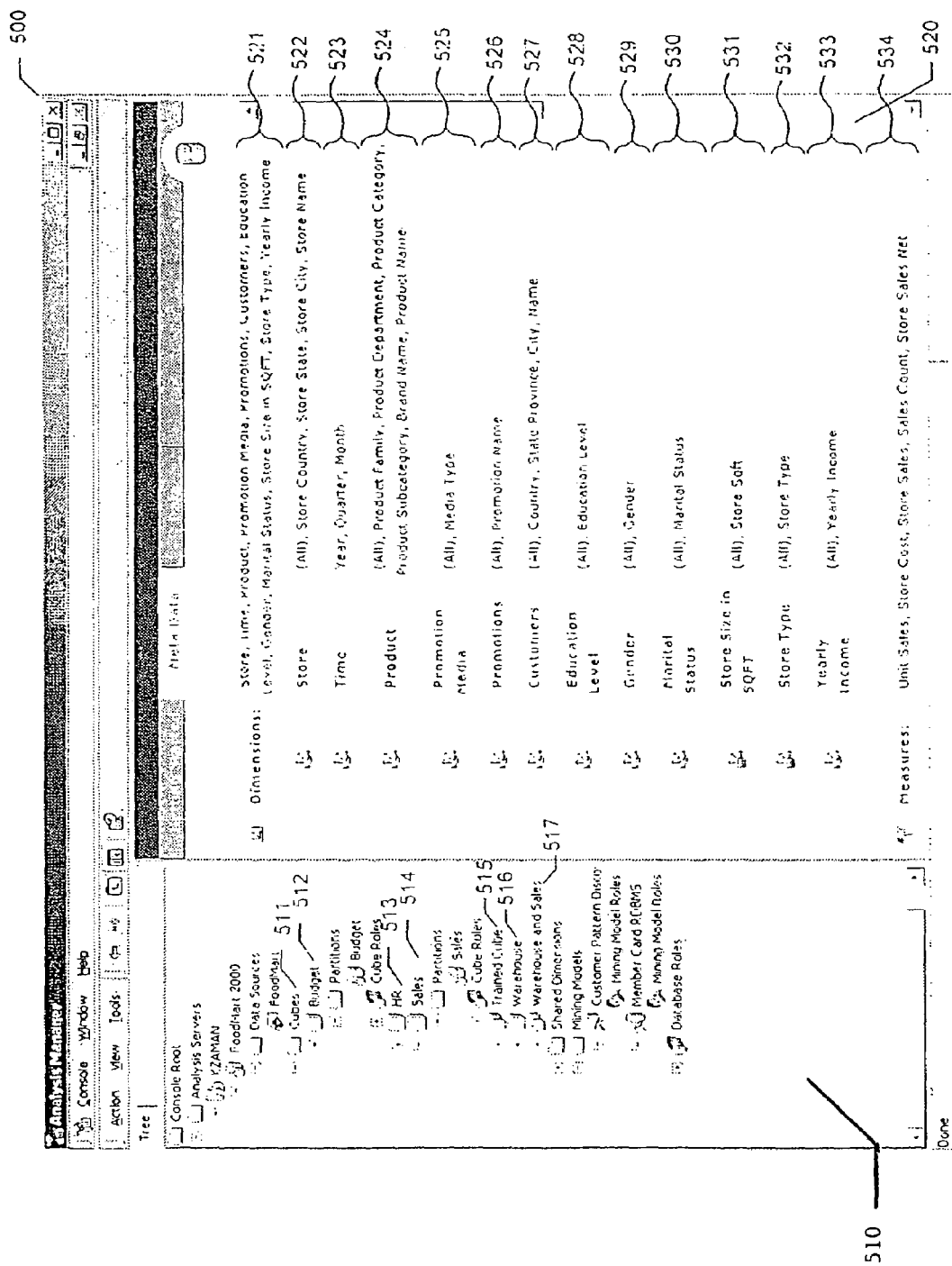
FIG. 5 is a display diagram showing a representation of a sample MD data source modeled by the facility generated by the MD database management system that maintains the sample MD data source.

FIG. 5 is a display diagram showing a representation of a sample MD data source modeled by the facility generated by the MD database management system that maintains the sample MD data source. A window 500 includes a navigation pane 510 and a detail pane 520. The navigation pane lists the different MD data cubes 511-517 available in the MD data source, and permits the user to select one of these cubes to display metadata for the cube. It can be seen that the user has selected sales cube 514 to display in detail page 520 the metadata for this cube. The metadata includes a list 521 of dimensions present in the cube, detailed as dimensions 522-533. The detail pane 520 also includes a list 534 of measures present in the sales cube, as well as detail about these measures (not shown).

Figure 6:
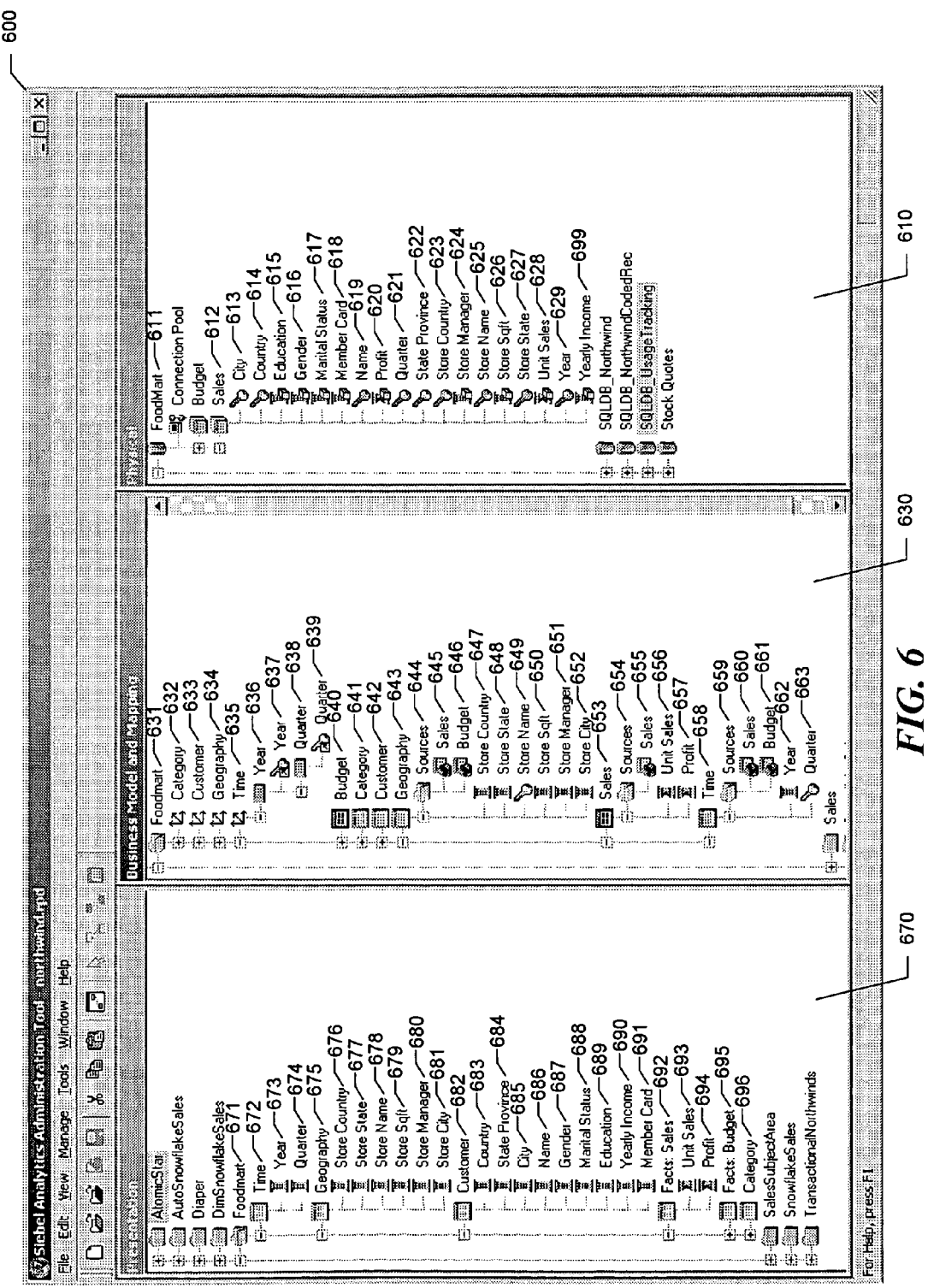
FIG. 6 is a display diagram showing a high-level representation of an MD data source in a relational database-driven application.

FIGS. 6-10 are display diagrams showing a typical user interface presented by the facility to enable a user to specify a relational model for an MD data source. FIG. 6 is a display diagram showing a high-level representation of an MD data source in a relational database-driven application—here, Siebel Analytics Server. This application represents relational data sources (and virtual relational data sources) in three different layers: a physical layer, used to store specific references into the physical data source; a logical, or "business model" layer, in which the application models the physical data source identified in the physical layer; and a presentation layer, containing a representation of the data source used in end-user displays relating to the data source that are generated by the application.

FIG. 6 shows a window 600, divided into a pane 610 for the physical layer, a pane 630 for the business model layer, and a pane 670 for the presentation layer. Each pane contains information representing the MD data source shown in FIG. 5. Pane 610 shows a sales table 612 corresponding to sales cube 514 shown in FIG. 5. Under the sales table, pane 610 shows table keys 613, 614, 619, 621-623, 625, 627, and 629; properties 615-618, 624, 626, and 699; and measures 620 and 628.

Pane 630 shows the business model layer, and lists for the data source 631 hierarchies 632-635—where the time hierarchy 635 has hierarchy levels 636 and 638; dimension tables 641-643 and 658 and their components; and fact tables 640 and 653 and their components.

Pane 670 shows the presentation layer, and lists for data source 670 a virtual relational time table 672, corresponding to time dimension table 658 in the business model pane and having columns 673 and 674; a geography virtual relational table 675, corresponding to geography dimension tables 643 in the business model layer, and having columns 676-681; a customer virtual relational table 682, corresponding to customer dimension table 642 in the business model layer and having columns 683-691; a facts:sales table 692, corresponding to sales fact table 653 in the business model layer and having columns 693 and 694; a facts:budget virtual relational table 695, corresponding to the budget fact table 640 in the business model layer; and a category virtual relational table 696, corresponding to the category dimension table 641 in the business model layer.

FIGS. 7-10 are display diagrams showing a typical user interface used by the facility to present detailed information in the business model layer. The sample information shown in these figures is displayed by the facility when the user selects the profit column 657 of the sales fact table 653 displayed in pane 630 for the business model layer in FIG. 6.

Figure 7:
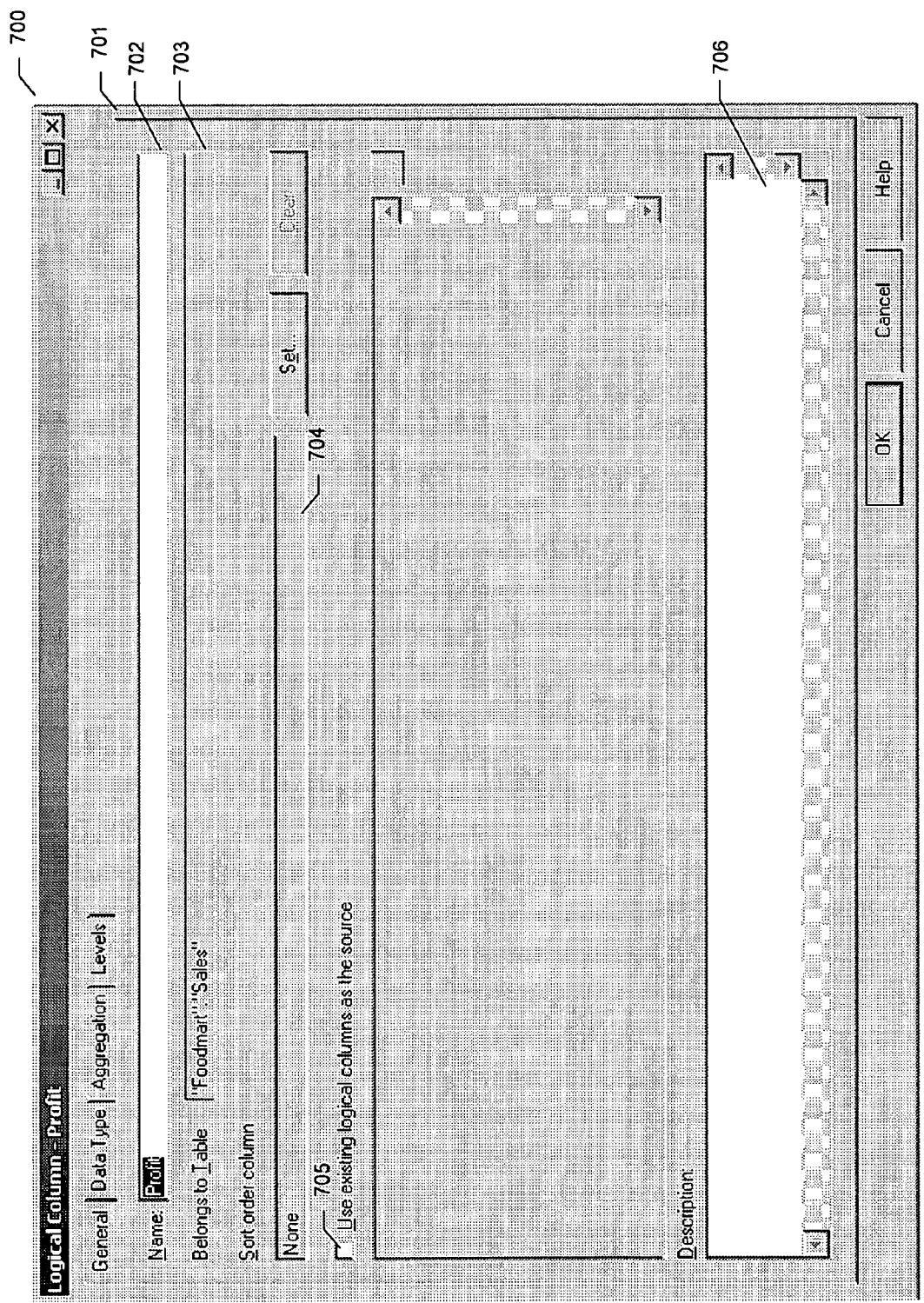
FIGS. 7-10 are display diagrams showing a typical user interface used by the facility to present detailed information in the business model layer.

FIG. 7 shows a general tab 701, into which the user may enter a name 702 of the column; the table 703 to which the column belongs; a sort order 704 for the column; an indication 705 to use existing logical columns as the source; and a description of the column 706.

Figure 8:
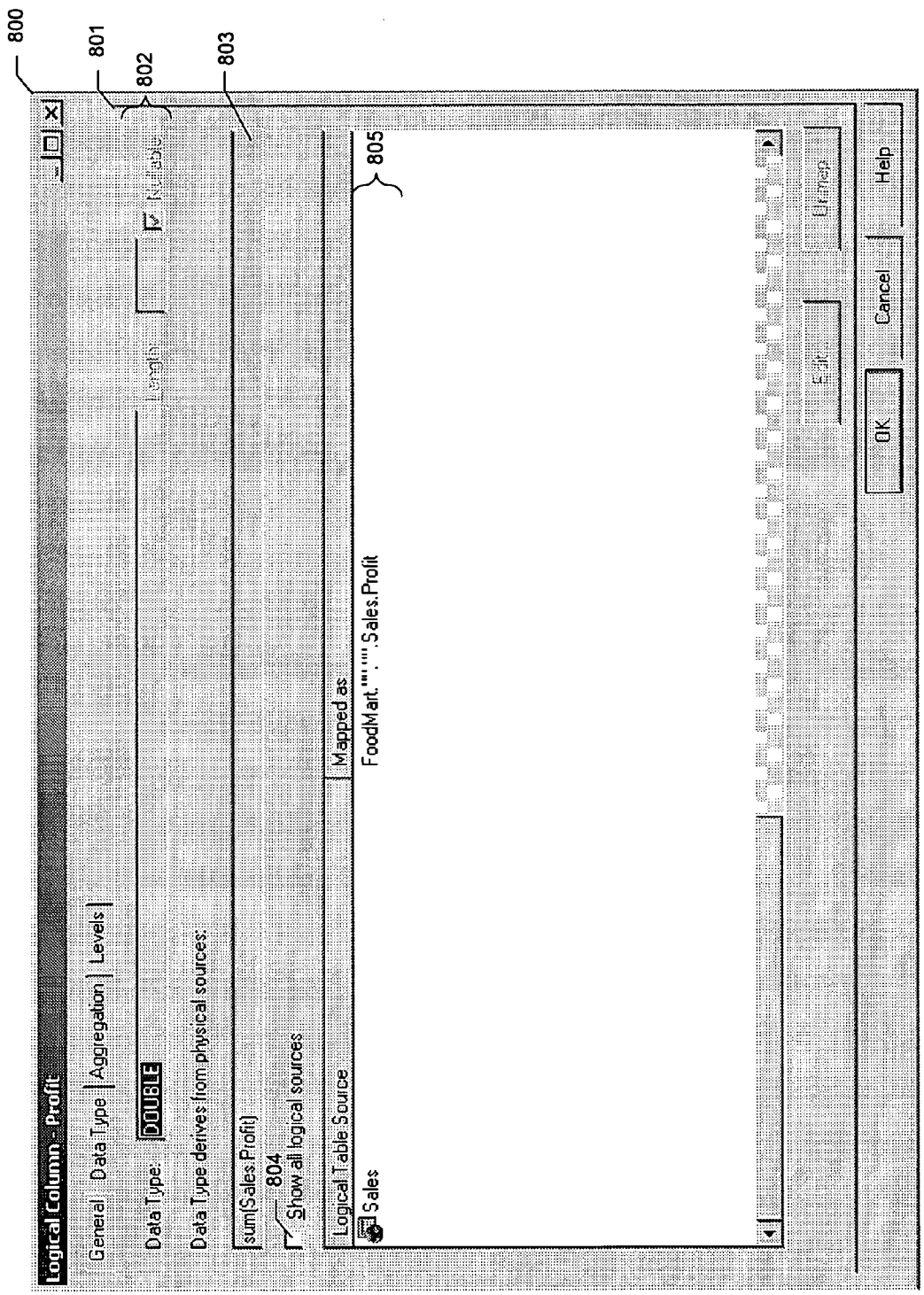

FIG. 8 shows a data type tab 801, into which the user may enter the data type 802 for the data contained by the column; the physical source 803 from which the data type derives; an indication 804 to show all logical sources; and information 805 about the sales logical table source and its mapping.

Figure 9:
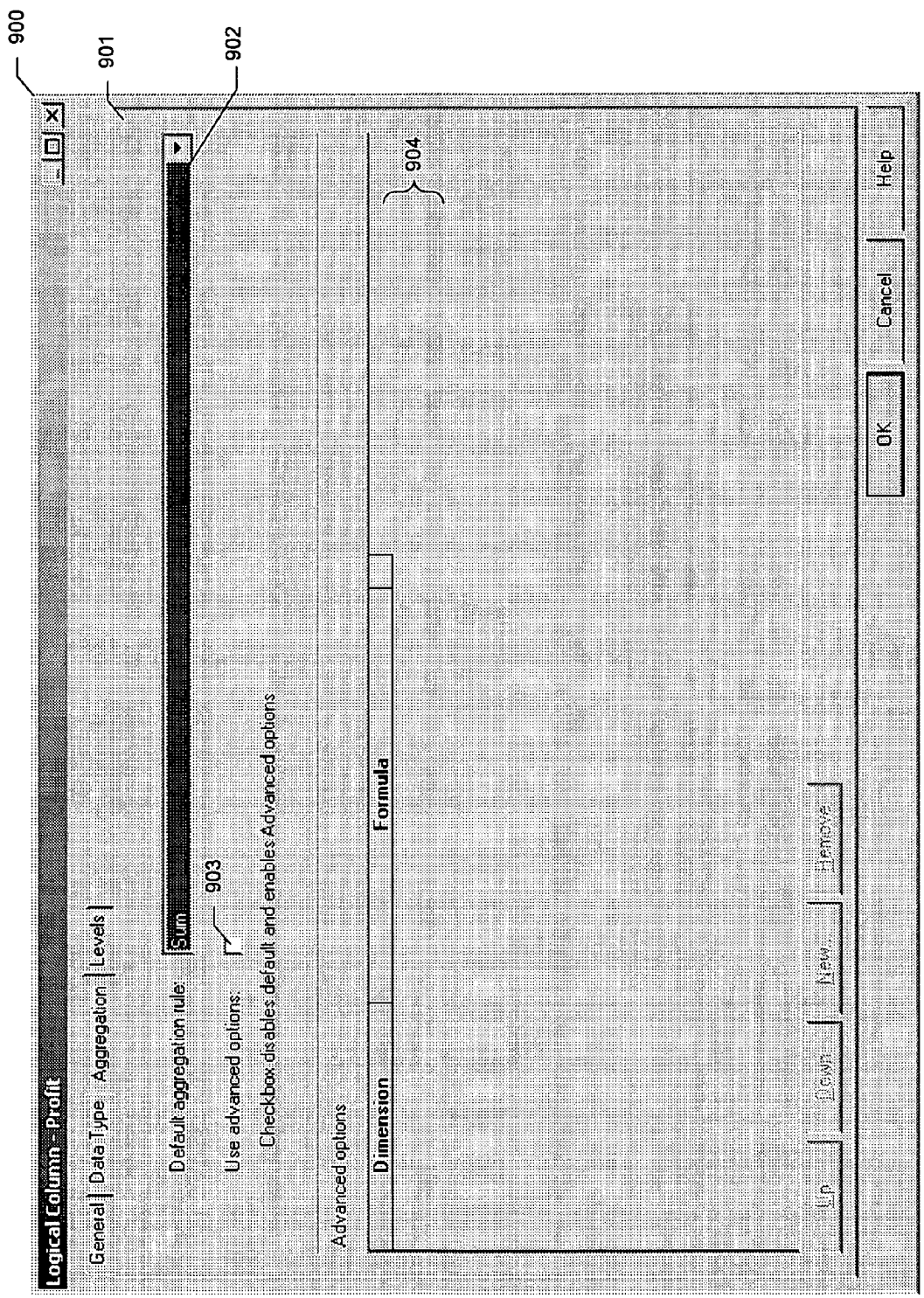

FIG. 9 shows an aggregation tab 901, into which the user may enter a default aggregation rule 902 for the column; an indication 903 to use advanced options for the column; and information 904 about advanced options for the column.

Figure 10:
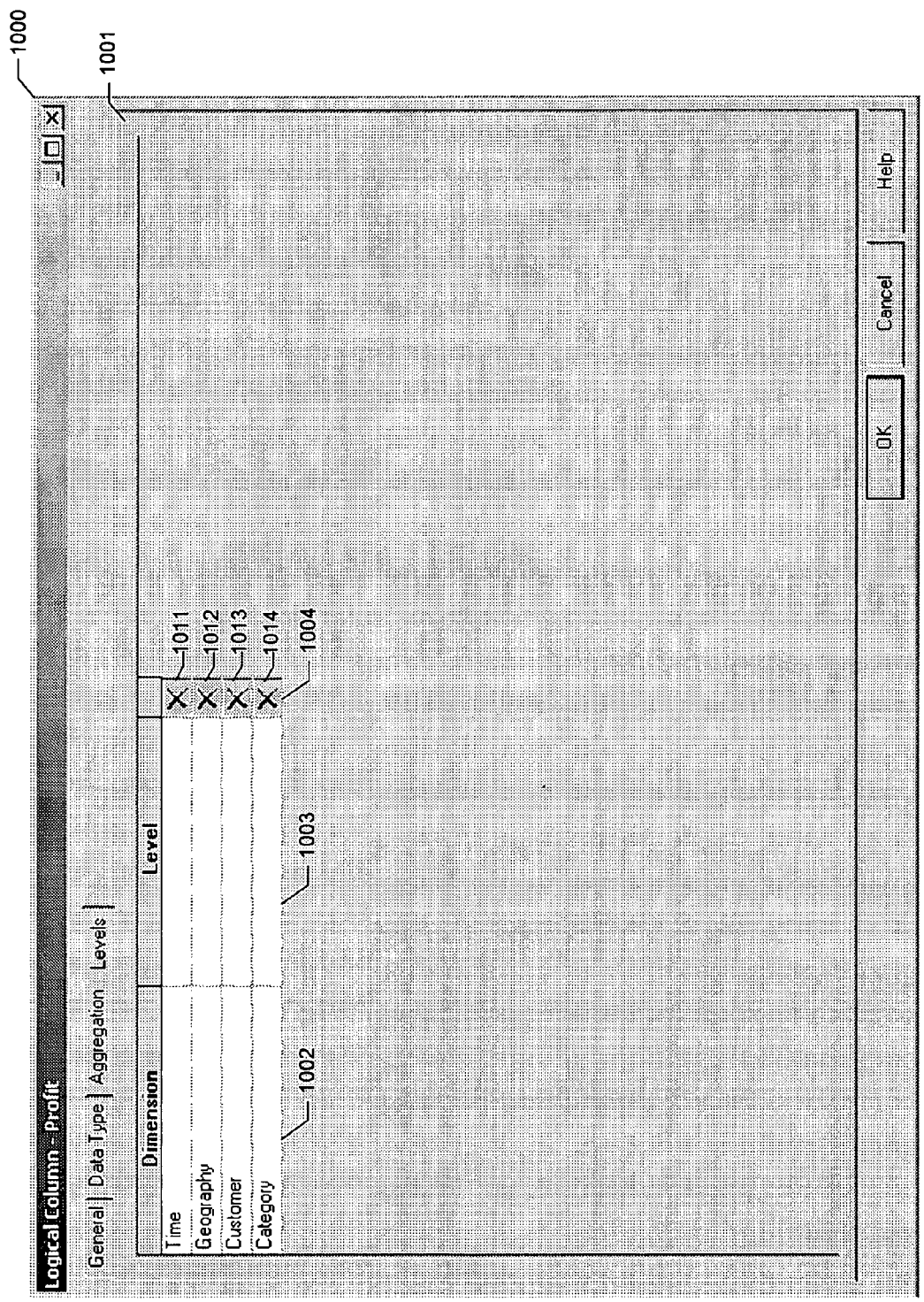

FIG. 10 shows a levels tab 1001 containing a table whose rows 1011-1014 each correspond to a dimension, and each include the dimension's name 1002, a level 1003 selected for the dimension, and a removed dimension control 1004 for removing the dimension from the table.

Figure 11:
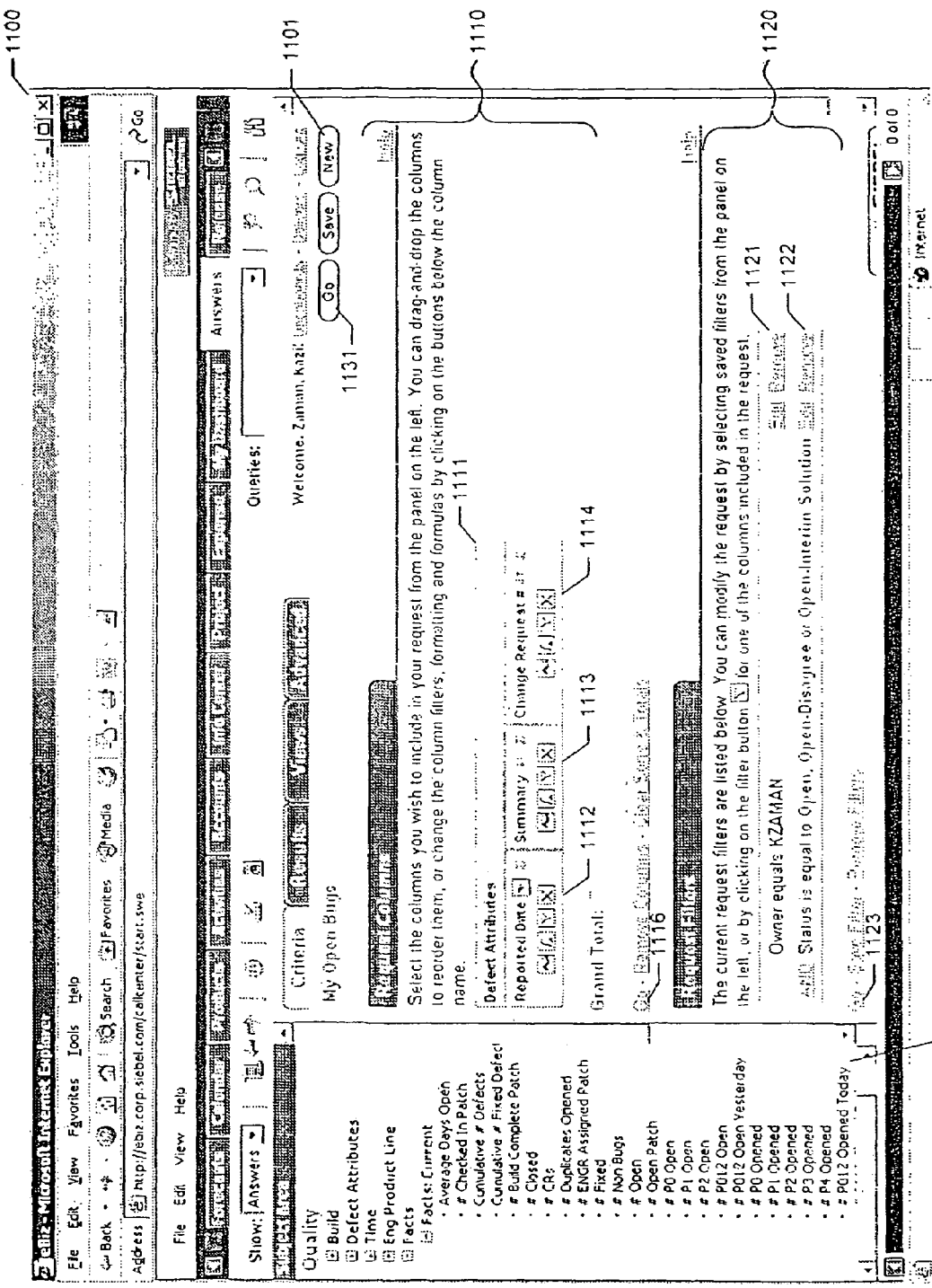
FIG. 11 is a display diagram showing a typical user interface presented by the facility to enable a user to specify a relational query.
Figure 12:
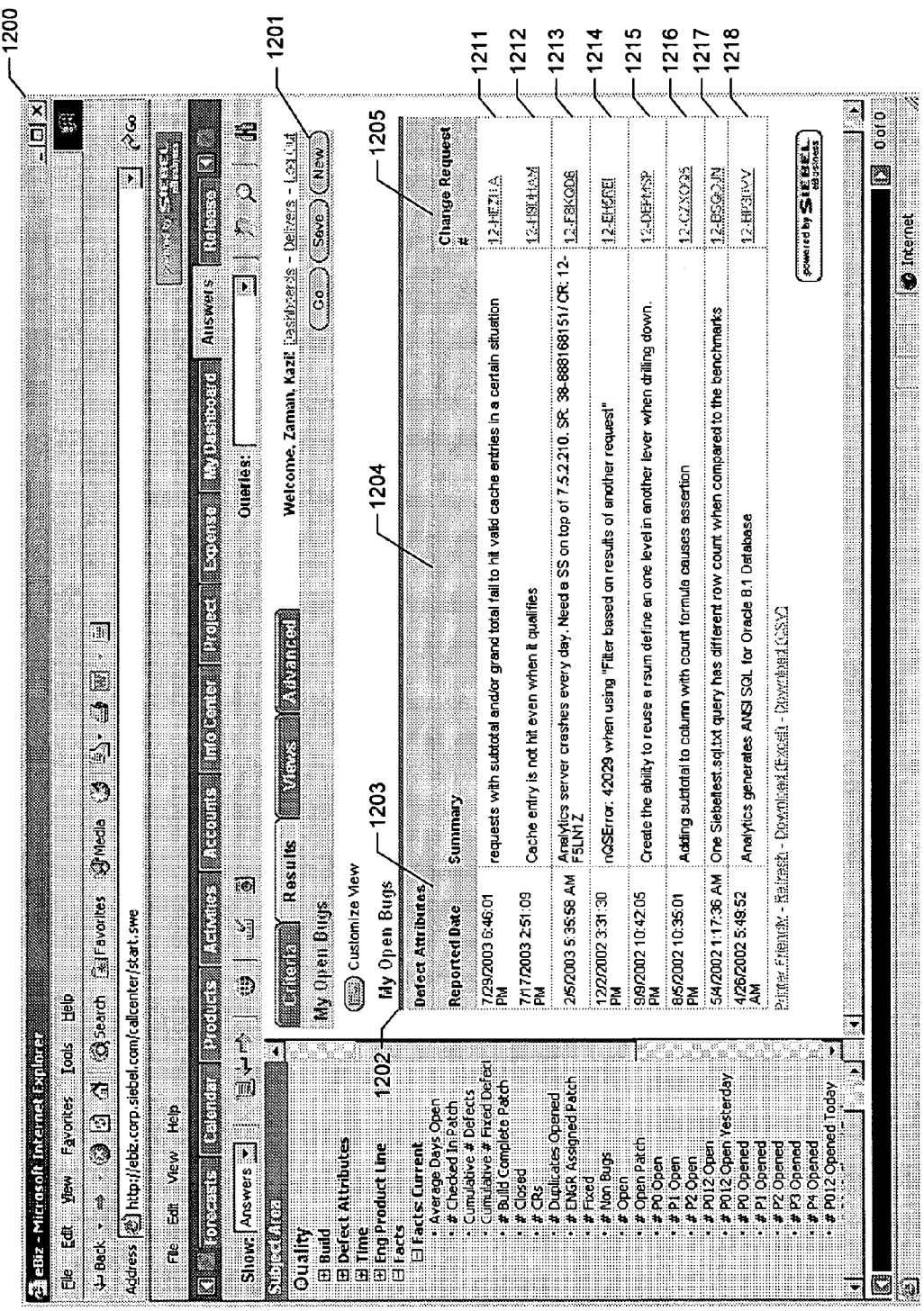
FIG. 12 is a display diagram showing a relational query result displayed in the application after being generated by the facility in response to the query whose specification is shown in FIG. 11.

FIGS. 11 and 12 are display diagrams showing a typical user interface presented to a user by the facility for performing relational queries against an MD data source. FIG. 11 is a display diagram showing a typical user interface presented by the facility to enable a user to specify a relational query. A window 1100 contains a query tab 1101, in which the user specifies a query. The specification tab includes a column specification section 1110 that lists columns of the virtual relational tables representing the MD data source that the user has selected for inclusion in the query from column pane 1102. The metadata shown in pane 1102 is populated from the presentation layer maintained for the repository by the application. It can be seen column specification section 1110 that the user has selected reported date column 1112, summary column 1113, and change request column 1114 of the defect attributes table. The query specification tab also includes a filter specification section 1120, in which the user specifies filters to be applied to the rows retrieved by the query. It can be seen that the user has specified two filters—filters 1121 and 1122—on the rows of the virtual relational table. After specifying the query in this manner, the user can activate any of the Go controls 1116, 1123, and 1131 in order to submit the query.

Based on the selected columns and filters, Siebel Analytics Web formulates a SQL query which it sends to the Siebel Analytics Server. The SQL corresponding to the query above is shown below.

```
SELECT
    "Defect Attributes"."Reported Date",
    "Defect Attributes".Summary,
    "Defect Attributes"."Change Request #"
FROM Quality
WHERE
("Defect Attributes".Owner = 'KZAMAN') AND
("Defect Attributes".Status IN
('Open', 'Open-Disagree', 'Open-Interim Solution'))
ORDER BY 1 DESC
```

The Siebel Analytics Server parses the incoming SQL. It examines the metadata in the repository and the query and then produces the appropriate queries to send to the back end databases. A single logical incoming query may result in multiple back end queries being generated. For relational databases, physical queries are generated in the appropriate dialect of vendor specific SQL. For multidimensional databases the facility generates MDX.

The Siebel Analytics Server integrates and post processes the results obtained from the physical queries generated. These results are sent back to the web.

FIG. 12 is a display diagram showing a relational query result displayed in the application after being generated by the facility as described above in response to the query whose specification is shown in FIG. 11. A window 1200 includes a query result tab 1201. The query result tab includes a table 1202 containing the query result. It can be seen that column 1203 of table 1202 corresponds to column 1112 specified in FIG. 11; that column 1204 in table 1202 corresponds to column 1113 specified in FIG. 11; and that column 1205 in table 1202 corresponds to column 1114 specified in FIG. 11. The table 1202 contains rows 1211-1218 each satisfying both request filter 1121 and request filter 1122, shown in FIG. 11. Accordingly, it can be seen that, using the facility, the user can merely specify a relational database query and receive a relational query result table in response.

Additional Discussion—Data Source Model Generation

This section describes how the facility adds a multidimensional data source to the physical layer of a repository.

a) Create a new database in the physical layer of the repository. The type of this database will be that of the specific multidimensional source (Essbase/Analysis Services) etc.

b) Create a connection pool object—an object in the Physical Layer that contains the connection information for a data source—for this database.

c) Create a cube under this database. Each database can have any number of cubes. Semantically, a cube is equivalent to a relational table. The cube will be given a name chosen by the administrator. Each cube will have as a property the name of the source cube name in the back end multidimensional source.

d) For the cube, choose a set of measures along with their datatypes.

e) Choose a subset of dimensions for the cube. For each dimension chosen specify a. The name of dimension
b. Number of levels chosen from dimension
c. For each level specify the name, number and datatype
   Additionally, we should specify if the column is nullable or not.
f) Define keys and foreign keys.
g) Map the cube to the logical layer wherever desired.

Conceptually, the cube can be treated as a table whose columns correspond to the measures and dimensions chosen. Multiple levels of a dimension can be chosen and each will map to a distinct column. This table has relational semantics like those of tables from other databases.

EXAMPLE

Selection 2 dimensions:
Geography with levels Country and State
Time with levels Year and Month
Select one measure: Dollars
This is equivalent to a table T (Country, State, Year, Month, Dollars).
   This table has a Multi column key (Country, State, Year, Month).
   The source cube is Sales.
This table will behave like any other regular table from a relational database, the semantics of usage will be identical.
A possible MDX equivalent to query Q="select * from T" is shown below

--- with
    member [measures].[CountryAnc] as
    'ancestor(Geography.Currentmember,[Country]).name'
    member [measures].[YearAnc] as
    'ancestor(Time.Currentmernber,[Year]).name'
select
    {[YearAnc],[CountryAnc],[Dollars]} on columns,
    nonemptycrossjoin(
    {[Geography].[State].members},{[Time].[month].members}) on rows
from
    Sales

---

New textboxes/tabs are added to the facility's data source modeling user interface for data input wherever necessary. The set features turned on will be similar to those chosen for the XML adapter, such as those shown below.
   IS_STRING_LITERAL_SUPPORTED=Yes;
   IS_INTEGER_LITERAL_SUPPORTED=Yes;
   IS_FLOAT_LITERAL_SUPPORTED=Yes;
   IS_EQUALITY_SUPPORTED=Yes;
   IS_LESS_THAN_SUPPORTED=Yes;
   IS_GREATER_THAN_SUPPORTED=Yes;
   IS_LESS_EQUAL_THAN_SUPPORTED=Yes;
   IS_GREATER_EQUAL_THAN_SUPPORTED=Yes;
   IS_NOT_EQUAL_SUPPORTED=Yes;
   IS_AND_SUPPORTED=Yes;
   IS_OR_SUPPORTED=Yes;
   IS_NOT_SUPPORTED=Yes;

The table defined by the cube should have as its primary key the set of all columns obtained from chosen dimensions. Note that the notion of dimensions is considerably simpler that that of dimensions currently in the logical layer. There is no notion of level keys etc. Dimensions are local to a particular cube and do not exist as objects which can be created and manipulated individually.

Changes:
a) New multidimensional database type for each vendor with appropriate indications of features supported by the corresponding MD database.
   a. database type: XMLA Server, Microsoft Analysis Server
   b. database client type: XMLA
b) New XMLA Connection Pool tab with appropriate fields:
   a. URL(or URI)
   b. User id //default is blank
   c. Password //default is blank
   d. DataSource
   e. Catalog
   f. Format //This is fixed: Multidimensional
   g. AxisFormat //This is fixed: TupleFormat
   h. MaxNumConnections
   i. QueryTimeOut
c) Cube creation.
   i. Create a Cube Table
      The cube will be displayed as a regular table, perhaps using a different icon. It can be created under a database/catalog/schema object.
      A cube table can have keys and foreign keys. It is a container of cube columns.
      The order of cube columns in a cube table is the same as regular columns in a regular table.
   ii. Create a Cube Column
      A dialog box may be preferably used to create a cube column. A cube column typically does not have the external name.
   iii. Create Hierarchies: the facility typically presents a user interface for creating hierarchies. A user can typically perform the following operations:
      Add/Remove a hierarchy
      Each hierarchy can have its descriptions
      Add/Remove/Order a cube column in a hierarchy.

Additional Discussion—Query Conversion

A basic Multidimensional Expressions (MDX) query is structured in a fashion similar to the following example:

---

[WITH <formula_specification>]
   [, <formula_specification>]
SELECT [<axis_specification>
   [, <axis_specification> . . . ]]
FROM [<cube_specification>]
   [WHERE [<slicer_specification>]]

---

Important MDX features used in the query generation algorithm include
   Named Sets
   Calculated members
   Crossjoins
   Ancestor and Descendants functions
   The Filter function
   The Generate function
   String comparison functions The discussion that follows refers to data structures employed by Siebel Analytics Server to hold various parts of an SQL query that the facility is transforming into an MDX query. The input is a RqList data structure marked for execution at the multidimensional database. The class of RqLists considered is equivalent the following class of SQL queries:

```
SELECT columnList, aggrList
FROM table
[WHERE predicate1]
[GROUP BY columnList]
[HAVING predicate2]
```

Additional Siebel Analytics Server data structures referenced in the portions of the SQL query that they contain are as follows:

RqList=Overall Query
RqProjection=SELECT clause
RqDetailFilter=WHERE clause
RqGroupBY=GROUP BY clause
RqHaving or RqSummaryFilter=HAVING clause
RqOrderBy=ORDER BY clause
RqJoinSpec=FROM clause The American National Standard ANSI INCITS 135-1992 (R1998), Information Systems-Database Language-SQL, available at http://webstore.ansi.org/ansidocstore/product.asp?sku=ANSI+INCITS+135%2D19 92+%28R1998%29, contains a thorough discussion of the SQL query language, and is hereby incorporated by reference in its entirety. For ease of exposition, MDX code generation algorithms are described in terms of SQL rather than Siebel Analytics Server internal data structures wherever possible.

Introduction

Various code generation strategies and the problems associated with each approach are illustrated, using the same running example throughout. The facility models a Siebel Analytics table based on the Sales cube from the demo application shipped with the Analysis Services 2000. Consider a table T based on the Sales Cube.

Select two hierarchies: Time (Levels: Year, Quarter) and Store (Levels: Store Country, Store State). Select one measure: Unit Sales The Siebel Analytics Repository contains a relational table T(Store Country, Store State, Year, Quarter, Unit Sales).

All features supported by Siebel Analytics SQL and other relational applications are not necessarily supported by multidimensional data sources. The features table for the multidimensional data source will be used to mark the appropriate parts of the query plan which can be executed at the back end.

A review of various simple SQL statements and their MDX counterparts follows.

```
SQL
    select * from T
MDX equivalent
    with
        member [measures].[CountryAnc] as
        'ancestor(Store.Currentmember,[Store Country]).name'
        member [measures].[YearAnc] as
        'ancestor(Time.Currentmember,[Year]).name'
    select
        {[YearAnc],[CountryAnc],[Unit Sales]} on columns,
        nonemptycrossjoin( {[Store].[Store
        State].members},{[Time].[Quarter].members}) on rows
    from
        Sales
```

There are a number of points to note by observing the equivalent MDX. Unlike SQL, MDX makes a distinction between measures and dimensions. A typical MDX query has only one level per dimension. To overcome this limitation, the facility uses the ancestor function to model what is actually a dimension as a member. An alternative strategy would be to obtain the columns from the higher levels of the hierarchy (Year, Country) from the fully qualified names of the lower levels. Example: a sample value for quarter with its fully qualified name would be 1997.Q2. The resultset parser can obtain the value 1997 for year. This approach has the advantage of not having to calculate additional cells at the multidimensional backend. Its drawback is that increases the complexity of parsing the results and requires that the parser have full knowledge of the cube hierarchies. Consider a hierarchy (Country->State->Zipcode) where the table only makes use of (Country->Zipcode). The fully qualified name would contain a value for state. Example: U S A.CA.94404 To obtain the appropriate value for Country, one might know about the level "state" and where it fits in the hierarchy. For some embodiments, this information is not be present in the repository.

Another issue to note is the ordering of columns. MDX does not output rowsets like SQL, the onus of stitching together the cells (unpivoting) with the appropriate multidimensional values lies on the parser. The MDX gateway uses a data structure specifying the ordering of columns when unpivoting a result set.

```
SQL
    Select Store Country, Store State, Unit Sales
    From T
    Where Store Country = "USA"
MDX - Alternative 1
    with
        member [measures].[CountryAnc] as
        'ancestor(Store.Currentmember,[Store
        Country]).name'
    select
        {[CountryAnc],[Unit Sales]} on columns,
        filter (nonemptycrossjoin( {[Store].[Store
        State].members},{[Time].[Quarter].members}),
        StrComp([CountryAnc],"USA") < > 0) on rows
    from
        Sales
```

Here, the MD database performs the filtering by using the filter statement within the select clause. This is not an appropriate strategy because the filtering is taking place after the crossjoin which is a very expensive operation. Whenever possible, the MD database executes the filter as soon as possible. Another point to note is that the MDX query contains a crossjoin with Time.Quarter.members, even though this is projected out in the final result. This is necessary to obtain the correct degree of aggregation for Unit Sales. The information on which columns to project out will be passed to the gateway in the same data structure as the ordering information.

```
MDX - Alternative 2
    with
        member [measures].[CountryAnc] as
        'ancestor(Store.Currentmember,[Store Country]).name'
        set [P] as 'Descendants([Store].[USA],[Store State])'
    select
        {[CountryAnc],[Unit Sales]} on columns,
        nonemptycrossjoin( {[P],{[Time].[Quarter].members}) on
        rows
    from
        Sales
```

This MDX query is considerably more efficient because the crossjoin occurs after the filtering.

A review of a SQL query with an IN predicate follows.

```
SQL
    Select Store Country, Store State, Unit Sales
    From T
    Where Store Country IN ("USA", "India")
MDX - Alternative 1
    with
        member [measures].[CountryAnc] as
        'ancestor(Store.Currentmember,[Store Country]).name'
        set [P] as 'Descendants([Store].[USA],[Store State])'
        set [Q] as 'Descendants([Store].[India],[Store State])'
    select
        {[CountryAnc],[Unit Sales]} on columns,
        nonemptycrossjoin( {[P],[Q]},{[Time].[Quarter].members}) on
        rows
    from
        Sales
```

This MDX query exposes an additional issue: "India" is not present as a member in the Store hierarchy. This causes an error message to be returned even though data is present for Store Country="USA". Clearly, this behavior is not desirable. If the WHERE clause predicate had been Store Country="India", an error message could not be avoided if we wanted to push the predicate into the MDX query. Another disadvantage of the "plug in" strategy is exposed when we do not use the complete hierarchy. Let (Country->State->Zipcode) be the complete hierarchy for a dimension. If the table modeled only makes use of (Country->Zipcode) we cannot adopt the "plug in" strategy without having the appropriate value for state.

We can adopt a different strategy which avoids some of the problems above. Rather than plug in the constants from the WHERE clause into dimensional hierarchies, we filter on all the members of a dimension at the level of interest. By using the generate function, the facility computes the descendants of all eligible members at this level. This technique works even when we skip levels of a hierarchy. It also enables the facility to support operators other than equality (>,<,>=,<=) if we can find the appropriate string functions in MDX.

```
MDX - Alternative 2
    with
        member [measures].[CountryAnc] as
        'ancestor(Store.Currentmember,[Store Country]).name'
        set [A] as 'Descendants([Store],[Store Country])'
        set [B] as 'filter([A],Store.Currentmember.name="USA" OR
        Store.Currentmember.name = "India")'
        set [C] as
        'Generate({[B]},Descendants(Store.currentmember,[Store
        State]))'
    select
        {[CountryAnc],[Unit Sales]} on columns,
        nonemptycrossjoin( {[C]},{[Time].[Quarter].members}) on
        rows
    from
        Sales
```

A MDX generation algorithm is described which embodies the principles described so far. This algorithm applies to SELECT-FROM-WHERE queries.

Algorithm A
Inputs:
a) RqList marked for remote execution at multidimensional data source. The features table is marked such that RqList will consist of a Projection list whose columns do not contain expressions, a detail filter and a single table under the RqJoinSpec. RqSummaryFilter, RqGroupBy and RqOrderBys will not mark for remote execution.

b) The metadata (hierarchy information) pertaining to the table the query is posed against.

Output:

A MDX query plus the required unpivoting information for formatting the MDX query result as a rowset.

1. Examine project list to build appropriate data structure for unpivoting. Verify that no expressions are present. If multiple levels are present for a particular dimension, create the appropriate ancestor measures as shown in the examples.

2. Verify that the RqList is against a single Cube.

3. Bucket predicates from the detail filter according to dimension. (Year=1995 and Month=July will fall in the same bucket).

4. For each dimension, sort predicates according to hierarchy level (levels closest to root first). Starting with the highest level create a named set containing all members at this level (using the descendants function). Use the filter function to filter this set appropriately. Repeat this process for the next highest level. We will terminate when we have a set of members at the lowest level of the dimension referred to in the table.

5. Nonemptycrossjoin sets obtained in step 4 and output on rows; output measures & calculated ancestor measures on columns.

Issues: Algorithm A produces MDX queries which produce measures at the lowest level of granularity of each dimension. (Example: select country, Unit Sales from T will have unit sales at the granularity of state, quarter with multiple rows for each country). These queries contain output for each dimension whether requested or not. In our example, this will be the information on the Time dimension. We will discuss unrequested information is discarded later in this document.

Pushing GROUP BYs

Algorithm A efficiently pushes filters for execution in multidimensional data sources. We can potentially improve performance by pushing GROUP BY's and carrying out aggregations remotely too.

```
SQL
    Select Store Country, Year, sum (Unit Sales)
    From T
    Group By Store Country, Year
```

Algorithm A would result in all the rows from the cube being fetched and the GROUP BY executed within the Siebel Analytics Server.

```
MDX equivalent 1
    with
        set [A] as 'Descendants([Store],[Store Country])'
        set [B] as 'Descendants([Time],[Year])'
    select
        {[Unit Sales]} on columns,
        nonemptycrossjoin( {[A]},{[B]}) on rows
    from
        Sales
```

The MDX query given above functionally achieves the goal. However, this query has a hidden assumption, that the aggregation rule defined on [Unit Sales] is Sum which is not necessarily true.

```
MDX equivalent 2
    with
        set [A] as 'Descendants([Store],[Store Country])'
        set [B] as 'Descendants([Time],[Year])'
        set [C] as 'nonemptycrossjoin({[A]},{[B]})'
        member [measures].[MS1] as
        'SUM(nonemptycrossjoin(Descendants(Store.currentmember,[Store
        State]), Descendants(Time.currentmember,[Quarter])),
        [Unit Sales])'
    select
        {[MS1]} on columns,
        {[C]} on rows
    from
        Sales
```

This strategy can be used for other aggregation functions like MAX/MIN/AVG. Note that if the aggregation rule defined for a measure is a SUM and we define a MAX on the measure in our query, we are computing a MAX over a SUM computed at a lower granularity. The SQL query before computes the maximum unit sales at the granularity of state on Store dimension and the granularity of quarter on the time dimension.

```
SQL
    Select Store Country, Year, max (Unit Sales)
    From T
    Group By Store Country, Year
MDX equivalent:
    with
        set [A] as 'Descendants([Store],[Store Country])'
        set [B] as 'Descendants([Time],[Year])'
        set [C] as 'nonemptycrossjoin({[A]},{[B]})'
        member [measures].[MS1] as
        'MAX(nonemptycrossjoin(Descendants(Store.currentmember,
        [Store State]), Descendants(Time.currentmember,[Quarter])),
        [Unit Sales])'
    select
        {[MS1]} on columns,
        {[C]} on rows
    from
        Sales
```

We now examine how we would handle filters along with GROUP BY's.

```
SQL
    Select Store Country, max(Unit Sales)
    From T
    Where year = 1997
    Group By Store Country
    Note that the time dimension is not present in the output.
MDX Alternative 1
    with
        set [A] as 'Descendants([Store],[Store Country])'
        set [B] as
        'Filter(Descendants([Time],[Year]),Time.currentmember.name=
        "1997")'
        member [measures].[MS1] as
        'MAX(nonemptycrossjoin(Descendants(Store.currentmember,
        [Store State]),
        Generate({[B]},Descendants(Time.currentmember,[Quarter]) )),
        [Unit Sales])'
    select
        {[MS1]} on columns,
        {[A]} on rows
    from
        Sales
```

```
MDX Alternative 2
    with
        set [A] as 'Descendants([Store],[Store Country])'
        member [measures].[MS1] as
        'MAX(Descendants(Store.currentmember,[Store State]), [Unit
        Sales])'
    select
        {[MS1]} on columns,
        {[A]} on rows
    from
        Sales
        Where ([1997])
```

MDX Alternative 2 does NOT compute the correct answer. The use of the slicer axis means that data is aggregated to the granularity of year whereas we want to compute the MAX of a set of cells at the granularity of quarter. Some embodiments of the facility cannot handle all GROUP BY's. Consider the following example:

SQL

Select Quarter, max(Unit Sales)

From T

Group By Quarter

This query is different from the ones discussed earlier in that the grouping attributes are not at the highest levels of the hierarchy. In some embodiments, the facility does not attempt to execute such GROUP BY's remotely. A review of the case where the GROUP BY contains multiple levels of a particular dimension follows.

```
SQL
    SELECT      Store Country, Store State, SUM(sales)
    FROM        T1
    GROUP BY    Store Country, Store State
MDX
    With
        member [measures].[CountryAnc] as
        'ancestor(Store.Currentmember,[Store Country]).name'
        set [P] as '[Store].[Store State].members'
    select
        {[CountryAnc],[Unit Sales]} on columns,
        [P] on rows
    from
        Sales
```

A review of a query with a folder follows.

```
SQL
    Select Store Country, Year, Max(Unit Sales)
    From T
    Where Store State = "CA" AND quarter = "Q1"
    Group By Store Country, Year
MDX
    with
        set [A] as 'Descendants([Store],[Store Country])'
        set [B] as 'Descendants([Time],[Year])'
        set [C] as 'nonemptycrossjoin({[A]},{[B]})'
        member [measures].[MS1] as
        'MAX(filter(nonemptycrossjoin(Descendants(Store.current-
        member,[Store State]),
        Descendants(Time.currentmember,[Quarter])),
        Store.currentmember.name = "CA" AND
        Time.currentmember.name = "Q1" ),[Unit Sales])'
    select
```

-continued

```
    {[MS1]} on columns,
    {[C]} on rows
from
    Sales
```

Consider table T2 (Store Country, Store State, Store City, Year, Quarter, Month, Unit Sales) based on the same Sales Cube with additional levels from the two hierarchies.

```
SQL
    Select Store Country, Year, max (Unit Sales)
    From T2
    Where Store State = "CA" AND quarter = "Q1"
    Group By Store Country, Year
    Note that we now have to compute the max at the granularity
    of city and
month.
MDX:
    with
        member [measures].[StateAnc] as
        'ancestor(Store.Currentmember,[Store State]).name'
        member [measures].[QuarterAnc] as
        'ancestor(Time.Currentmember,[Quarter]).name'
        set [A] as 'Descendants([Store],[Store Country])'
        set [B] as 'Descendants([Time],[Year])'
        set [C] as 'nonemptycrossjoin({[A]},{[B]})'
        member [measures].[MS1] as
        'MAX(filter(nonemptycrossjoin(Descendants(Store.current-
        member,[Store City]), Descendants(Time.current-
        member,[Month])),
        StrComp([StateAnc],"CA") = 0 AND
        StrComp([QuarterAnc],"Q1") = 0 ),[Unit Sales])'
    select
        {[MS1]} on columns,
        {[C]} on rows
    from
        Sales
```

The previous examples show that it is only possible to mark GROUP BY's for remote execution in certain circumstances. The conditions under which a GROUP BY is markable are as follows:

For each dimension referred to in the GROUP BY, the highest (closest to root) level of that dimension (referred to in the table) must be present as one of the grouping columns in the GROUP BY. If multiple levels of a dimension are present, there should be no gaps between levels. No measures can be present as a grouping column.

Consider the "no gaps" rule in connection with the following example.

```
SQL
    Select Store Country, Store City, max (Unit Sales)
    From T2
    Group By Store Country, Store City
```

In this example, the hierarchy has a "gap," as Store State is not included in the GROUP BY. Consider the country USA and the city Springfield. There are many Springfields in the USA, Illinois and Massachusetts being just two examples. In the SQL query posed, there will be a single output row for all Springfields in the USA. This will not be the case if we generate MDX of the form shown earlier.

Algorithm B
    Inputs:
    a) RqList marked for remote execution at multidimensional data source. The features table is marked such that RqList will consist of a Projection list whose columns do not contain expressions, a detail filter [consisting of a conjunction of dimension eq constant predicates] and a single table under the RqJoinSpec.

RqGroupBys will mark for execution where possible. [Rq-SummaryFilter, and] RqOrderBys will not mark for remote execution.

b) The metadata pertaining to the table the query is posed against.
    Output:
    A MDX query plus the required unpivoting information for formatting the MDX query result as a rowset.

1. Examine the GROUP BY. If a GROUP BY is not present, use Algorithm A

2. Examine project list to build appropriate data structure for unpivoting. Verify that no expressions are present. If multiple levels are present for a particular dimension, create the appropriate ancestor measures as shown in the examples.

3. Verify that the RqList is against a single Cube.

4. Bucket predicates from the detail filter according to dimension. (Year=1995 and Month=July will fall in the same bucket).

5. For each dimension referred to in a filter but not in the project list, sort predicates according to hierarchy level (levels closest to root first). Starting with the highest level create a named set containing all members at this level (using the descendants function). Use the filter function to filter this set appropriately. Repeat this process for the next highest level. We will terminate when we have a set of members at the lowest level of the dimension referred to in the table. We have one named set per dimension(D1,D2 etc).

6. For dimensions not in the project list and not referred to in a filter, create a named set corresponding to the lowest level of that dimension referred to in the table.

7. Examine the GROUP BY. Verify that the set of grouping columns is exactly the set of non aggregates in the project list.

8. For each projected dimension (PD1,PD2, . . . ), create a named set consisting of the lowest level projected members of that dimension. If any filters exist on higher levels apply the filters. Let the sets be P1,P2 etc.

9. Nonemptycrossjoin sets obtained in step 8 (call this set [Q]=nonemptycrossjoin (P1,P2 . . . )). Create a new calculated member (MS1,MS2 . . . ) for each aggregate in the project list. This member will be of the form (aggRule(Filter (nonemptycrossjoin(Descendants(PD1.currentmember, [lowest level]), . . . , D1,D2, . . . Dn) predicate))

10. Output [P] on rows; output MS1,MS2 . . . & calculated ancestor measures on columns. Query Post Processing As discussed above, the MDX query generated may bring back extra data. This may happen in a number of different cases too. Consider the case where we have a query with only dimensions.

```
SQL
    Select Store Country
    From T2
```

Every MDX query contains a measure. Thus, the measure cells returned by this query would have to be ignored.

Similarly measure only MDX queries, will have to ask for the lowest level of each dimension to match the output of the SQL query.

In addition to redundant data, the facility addresses the issue of ordering. SQL has a notion of ordered columns in the resultset, MDX does not. Consider the following two SQL queries:

```
SQL Q1
    Select Store Country, Unit Sales
    From T2
```

SQL Q2
   Select Unit Sales, Store Country
   From T2

Both of these SQL queries will map to the same MDX query. However, we need some notion of ordering from the MDX query since the Siebel Analytics Server expects resultsets from back end data sources.

The facility uses a protocol for ordering MDX output. Both Algorithm A&B follow the same general form. All measures (including calculated ancestor members) will be output on columns, while all dimensions will be on rows. The ordering+ redundant data processing information can be passed via a vector whose elements consist of column indexes and row indexes.

EXAMPLE

Select c1, c2, c3 on columns,
   r1, r2 on rows
From Cube

If this query had as its post processing vector <c3,c2,r1>, it would mean that r2&c1 would be dropped and the left to right column ordering is as indicated by the order of elements in the vector.

HAVING Clause Pushdown

The Siebel Analytics server generates HAVING clauses which are distinct from Summary filters. All summary filters are removed by the ExpandSummaryFilter rewrite rule. The PushDownFilter rewrite rule introduces the RqHaving object as a child of a RqList wherever feasible.

Algorithm B can be extended to handle the HAVING clause. This could be done by applying the filter clause on the named set we are outputting on rows. Let us examine which class of predicates in the HAVING clause can be handled.

The HAVING clause can refer to constants, dimensional members or aggregated measures. The multidimensional members we can refer to are restricted by those present in the GROUP BY clause. The aggregated measures we can refer to are restricted to those present in the project list. We can clearly handle the case where predicates are of the form (agg op agg), (agg op constant), (constant op agg) since aggregates are available as [MS1], [MS2] etc generated by Algorithm B. Multidimensional members are also available as dimensionName.currentmember.name. The facility handles all classes of HAVING predicates not involving unsupported expressions/functions.

In some embodiments, the facility utilizes additional metadata in the physical layer that indicates which aggregation rule is used for a particular measure in the backend database. For example, the measure [Profits] may be augmented with metadata indicating that the aggregation rule is SUM.

This additional metadata enables the facility to generate more efficient MDX against the backend multidimensional database for certain classes of queries—specifically queries without filters referencing levels below the levels of aggregation.

EXAMPLE

Consider the following query against the Sales table:

```
select            Year, SUM(profit )
from              Sales
group by Year
```

In some embodiments, the facility generates the following MDX for this query:

```
With
    member [measures].[YearAnc] as 'ancestor([Time].
    Currentmember, [Time]. [Year]). name'
    set [Customers4] as '({[Customers].[Name].members})'
    set [Store3] as '({[Store].[Store Name].members})'
    set [Time1] as '({[Time].[Year].members})'
    set [Q] as '{[Time1]}'
    member [measures].[MS1] as 'SUM (nonemptycrossjoin
    ({[Customers4]}, {[Store3]}, Descendants ([Time].
    currentmember, [Time].[Quarter])), [Profit])'
select
    {[measures].[MS1]} on columns,
    {[Q]} on rows
from
    [Sales]
```

By making use of the additional metadata, the facility generates the following MDX:

```
With
    member [measures].[YearAnc] as
    'ancestor([Time].Currentmember,[Time].[Year]).name'
    set [Customers4] as '({[Customers].[Name].members})'
    set [Store3] as '({[Store].[Store Name].members})'
    set [Time1] as '({[Time].[Year].members})'
    set [Q] as '{[Time1]}'
    member [measures].[MS1] as '[Profit]'
select
    {[measures].[MS1]} on columns,
    {[Q]} on rows
from
    [Sales]
```

The second query is more efficient than the first one, as it avoids using a costly crossjoin operation. This optimization is possible because the aggregation on the profit-column in the query—SUM—matches the aggregation function on the measure profit measure in the backend multidimensional database.

CONCLUSION

It will be appreciated by those skilled in the art that the above-described facility may be straightforwardly adapted or extended in various ways. For example, the facility may operate as part of the application, as part of the MD database system, or independent of both. The facility may operate in conjunction with virtually any application that consumes relational database data, and may operate in conjunction with virtually any MD database system using a variety of data models and query languages. While the foregoing description makes reference to preferred embodiments, the scope of the invention is defined solely by the claims that follow and the elements recited therein.

We claim:

1. A method for processing a relational database query, comprising:
   generating, using a processor coupled to a multidimensional data source, a relational model of the multidimensional data source using one or more of a schema for the multidimensional data source and metadata for the multidimensional data source,
   wherein the relational model comprises:
      a relational-to-multidimensional mapping between a virtual relational table for a relational database application corresponding to the multidimensional data source and the multidimensional data source, and the schema and metadata accessed from the multidimensional data source for the virtual relational table;

forming the relational database query from the relational database application against the relational model of the multidimensional data source using a graphical user interface displayed on a display coupled to the processor, wherein the graphical user interface:

displays a presentation layer representation of the virtual relational table for the relational database application corresponding to the multidimensional data source, enables pointer-driven selection for query of one or more tables and columns of data stored in the multidimensional data source and represented by the displayed presentation layer representation, and enables selection of a detail filter to apply against the relational model;

receiving the relational database query, the received relational database query being drawn against the relational model of the multidimensional data source, wherein the relational database query specifies a detail filter against the relational model having selected predicates;

using the relational-to-multidimensional mapping together with relational/multidimensional equivalency logic to construct a multidimensional database query based on the received relational database query, wherein the relational/multidimensional equivalency logic comprises a general mapping between relational queries and structures and multidimensional queries and structures, wherein the constructed multidimensional query specifies, for each of the selected predicates that can be applied against the relational model of the multidimensional data source before a crossjoin operation is performed, applying the selected predicate against the relational model of the multidimensional data source before the crossjoin operation is performed;

submitting the constructed multidimensional database query for execution against the modeled multidimensional data source, wherein the multidimensional data source comprises three or more dimensions; and displaying, on the display, a result of the constructed multidimensional database query against the modeled multidimensional data source.

2. The method of claim 1 wherein the multidimensional query is constructed in MDX (Multidimensional Expressions).

3. The method of claim 2 wherein the relational query is expressed in SQL(Structured Query Language).

4. The method of claim 1 wherein the relational query is expressed in SQL (Structured Query Language), and wherein the detail filter specified by the relational query is an SQL WHERE clause.

5. method of claim 1 wherein the relational query specifies an aggregation function against the relational model, and wherein the constructed multidimensional query specifies that the aggregation function be applied to the modeled multidimensional data source.

6. The method of claim 5 wherein the relational query is expressed in SQL (Structured Query Language), and wherein the aggregation function specified by the relational query is an SQL GROUP BY clause.

7. The method of claim 1, wherein the graphical user interface enables selection of a summary filter to apply against the relational model, the relational query specifies the summary filter against the relational model, and the constructed multidimensional query specifies that the summary filter be applied to the modeled multidimensional data source.

8. The method of claim 7 wherein the relational query is expressed in SQL(Structured Query Language), and wherein the summary filter specified by the relational query is an SQL HAVING clause.

9. The method of claim 1, wherein the selected predicates are applied against the modeled multidimensional data source as early as possible.

10. The method of claim 1 wherein the relational query specifies performing a selected aggregation function on a selected column of the virtual relational table, the virtual relational table corresponding to a multidimensional data source, the selected column corresponding to a selected measure of the multidimensional data source, the method further comprising:

retrieving metadata identifying an aggregation function used for the selected measure of the multidimensional data source;

determining whether the aggregation function identified by the metadata matches the selected aggregation function; and if the aggregation function identified by the metadata matches the selected aggregation function, generating a multidimensional query against the multidimensional data source that relies on the aggregation function performed in the multidimensional data source.

11. The method of claim 1, further comprising:

receiving, in response to submitting the multidimensional database query, a multidimensional database query result; and using a relational-to-multidimensional mapping contained by the model together with relational/multidimensional equivalency logic to construct a relational database query result based on the received multidimensional database query result.

12. The method of claim 1, further comprising:

determining that the received relational database query is drawn against both the relational model of the multidimensional data source and one or more native relational tables; and constructing a native relational database query based on aspects of the received relational database query drawn against conventional relational tables; and submitting the native relational database query for execution against the conventional relational tables, and wherein the constructed multidimensional database query is based on aspects of the received relational database query drawn against the relational model of the multidimensional data source, the method further comprising:

receiving, in response to submitting the native relational database query, a native relational database query result; and combining the constructed relational database query result with the received native relational database query result in accordance with the received relational database query.

13. The method of claim 1, further comprising making information about the model available for use in building the received relational database query.

14. The method of claim 1, further comprising:
determining that the received relational database query is drawn against both the relational model of the multidimensional data source and one or more native relational tables; and
constructing a native relational database query based on aspects of the received relational database query drawn against conventional relational tables; and
submitting the native relational database query for execution against the conventional relational tables,
and wherein the constructed multidimensional database query is based on aspects of the received relational database query drawn against the relational model of the multidimensional data source.

15. A computer-readable medium comprising instructions to cause a computing system to process a relational database query, said instructions comprising:
a first set of instructions, executable on a processor, configured to generate a relational model of a multidimensional data source using one or more of a schema for the multidimensional data source and metadata for the multidimensional data source,
the relational model comprises:
a relational-to-multidimensional mapping between a virtual relational table for a relational database application corresponding to the multidimensional data source and the multidimensional data source, and
the schema and metadata accessed from the multidimensional data source for the virtual relational table;
a second set of instructions, executable on a processor, configured to form the relational database query from the relational database application against the relational model of the multidimensional data source using a graphical user interface, wherein the graphical user interface:
displays a presentation layer representation of the virtual relational table for the relational application corresponding to the multidimensional data source,
enables pointer-driven selection for query of one or more tables and columns of data stored in the multidimensional data source and represented by the displayed presentation layer representation, and
enables selection of a detail filter to apply against the relational model;
a third set of instructions, executable on a processor, configured to receive the relational database query, the received relational database query being drawn against the relational model of the multidimensional data source, wherein
the relational database query specifies a detail filter against the relational model having selected predicates;
a fourth set of instructions, executable on the processor, configured to use the relational-to-multidimensional mapping to translate the received relational database query into a multidimensional database query, wherein the multidimensional query specifies, for each of the selected predicates that can be applied against the relational model of the multidimensional data source before a crossjoin operation is performed, applying the selected predicate against the relational model of the multidimensional data source before the cross join operation is performed;
a fifth set of instructions, executable on the processor, configured to submit the multidimensional database query for execution against the relational model of the multidimensional data source, wherein the multidimensional data source comprises three or more dimensions; and
a sixth set of instructions, executable on the processor, configured to display a result of the multidimensional database query against the modeled multidimensional data source.

16. The computer-readable medium of claim 15 further comprising:
a seventh set of instructions, executable on the processor, configured to receive, in response to submitting the multidimensional database query, a multidimensional database query result; and
an eighth set of instructions, executable on the processor, configured to use a relational-to-multidimensional mapping to translate the received multidimensional database query result into a relational database query result.

17. A computing system for processing a relational database query, comprising:
a processor;
a display coupled to the processor;
a modeling subsystem configured to execute on the processor and further configured to generate a relational model of a multidimensional data source using one or more of a schema for the multidimensional data source and metadata for the multidimensional data source, wherein the relational model comprises:
a relational-to-multidimensional mapping between the virtual relational table for a relational database application corresponding to the multidimensional data source and the multidimensional data source, and
the schema and metadata accessed from the multidimensional data source for the virtual relational table;
a graphical user interface subsystem configured to execute on the processor and further configured to form the relational database query from the relational database application against the relational model of the multidimensional data source, wherein the graphical user interface subsystem further
displays a presentation layer representation of the virtual relational table for a relational database application corresponding to the multidimensional data source on the display,
enables pointer-driven selection for query of one or more tables and columns of data stored in the multidimensional data source and represented by the displayed presentation layer representation, and
enables selection of a detail filter to apply against the relational model;
a query reception subsystem configured to execute on the processor and further configured to receive the relational database query, the received relational database query being drawn against the relational model of the multidimensional data source, wherein the relational database query specifies a detail filter against the relational model having selected predicates;
a multidimensional query construction subsystem configured to execute on the processor and further configured to use the relational-to-multidimensional mapping to construct a multidimensional database query based on the received relational database query, wherein the constructed multidimensional query specifies, for each of the selected predicates that can be applied against the relational model of the multidimensional data source before a crossjoin operation is performed, applying the selected predicate against the relational model of the multidimensional data source before the cross join operation is performed; and a query submission subsystem configured to execute on the processor and further configured to submit the constructed multidimensional database query for execution against the modeled multidimensional data source, wherein the multidimensional data source comprises three or more dimensions.

18. The computing system of claim 17, further comprising:
a query result reception subsystem that receives, in response to submitting the multidimensional database query, a multidimensional database query result; and
a relational query result construction subsystem that uses a relational-to-multidimensional mapping to construct a relational database query result based on the received multidimensional database query result.

19. A method for processing a relational database query, comprising:
generating, using a processor coupled to a multidimensional data source, a relational model of the multidimensional data source using one or more of a schema for the multidimensional data source and metadata for the multidimensional data source,
wherein the relational model comprises:
  a relational-to-multidimensional mapping between a virtual relational table for a relational database application corresponding to the multidimensional data source and the multidimensional data source, and
  the schema and metadata accessed from the multidimensional data source for the virtual relational table;
forming the relational database query from the relational database application against a relational model of a multidimensional data source using a graphical user interface displayed on a display coupled to the processor, wherein the graphical user interface:
  displays a presentation layer representation of the virtual relational table for a relational database application corresponding to the multidimensional data source,
  enables pointer-driven selection for database query of one or more tables and columns of data stored in the multidimensional data source and represented by the displayed presentation layer representation, and
  enables selection of a detail filter to apply against the relational model;
receiving the relational database query, the received relational database query being drawn against both the relational model of a multidimensional data source and a native relational table, and wherein the relational database query specifies a detail filter against the relational model having selected predicates;
converting the received relational database query into (1) a native relational database query against only the native relational table, and (2) a multidimensional database query against the multidimensional data source, wherein the multidimensional query specifies, for each of the selected predicates that can be applied against the relational model of the multidimensional data source before a crossjoin operation is performed, applying the selected predicate against the relational model of the multidimensional data source before the crossjoin operation is performed;
submitting the native relational database query against the native relational table;
submitting the multidimensional database query against the multidimensional data source, wherein the multidimensional data source comprises three or more dimensions:
combining contents of a first search result produced in response to the native relational database query and a second search result produced in response to the multidimensional database query into a third search result responsive to the received relational database query; and
displaying, on the display, the third search result.

* * * * *

UNITED STATES PATENT AND TRADEMARK OFFICE
CERTIFICATE OF CORRECTION

PATENT NO. : 7,657,516 B2  Page 1 of 1
APPLICATION NO. : 10/726338
DATED : February 2, 2010
INVENTOR(S) : Kazi A. Zaman et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 535 days.

In column 1, line 18, after "language" insert -- . --.

In column 7, line 37, delete "Currentmernber," and insert -- Currentmember, --, therefor.

In column 7, line 16, delete "not be" and insert -- not --, therefor.

In column 7, line 61, delete "{[P],"  and insert -- {[P]}, --, therefor.

In column 16, line 45, delete "Dn)" and insert -- Dn), --, therefor.

In column 19, line 54, in claim 3, delete "SQL(Structured" and insert -- SQL (Structured --, therefor.

In column 19, line 59, in claim 5, delete "method" and insert -- The method --, therefor.

In column 20, line 10, in claim 8, delete "SQL(Structured" and insert -- SQL (Structured --, therefor.

Signed and Sealed this

Fourteenth Day of September, 2010

David J. Kappos
*Director of the United States Patent and Trademark Office*